Feb. 20, 1968  L. J. MARTINSEN  3,369,585
CREDIT CARD POCKETBOOK
Filed June 15, 1966  2 Sheets-Sheet 1
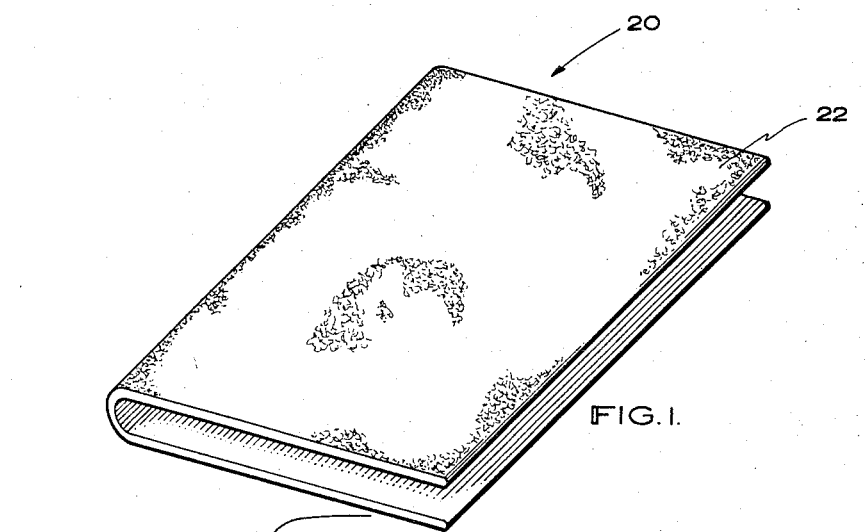
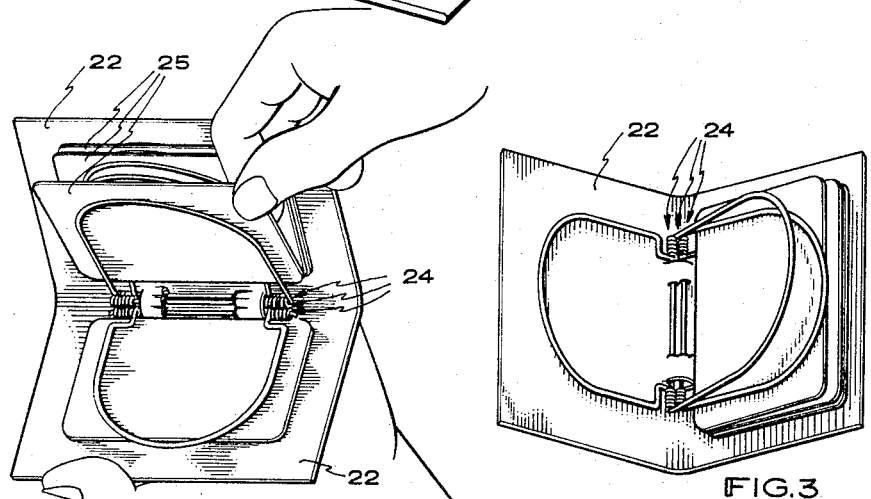
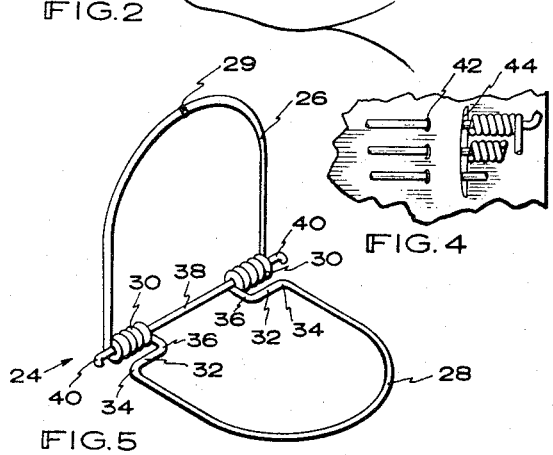
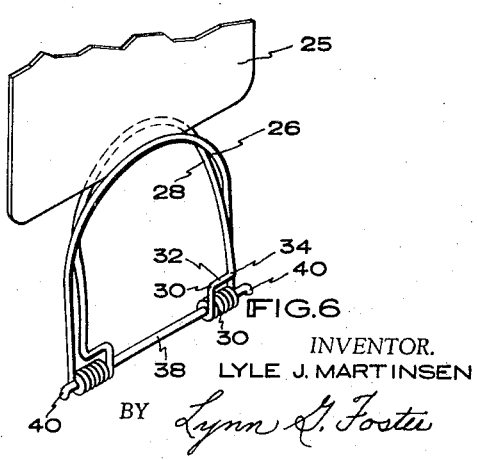
INVENTOR.
LYLE J. MARTINSEN
BY *Lynn G. Foster*
HIS ATTORNEY Feb. 20, 1968 L. J. MARTINSEN 3,369,585
CREDIT CARD POCKETBOOK
Filed June 15, 1966 2 Sheets-Sheet 2
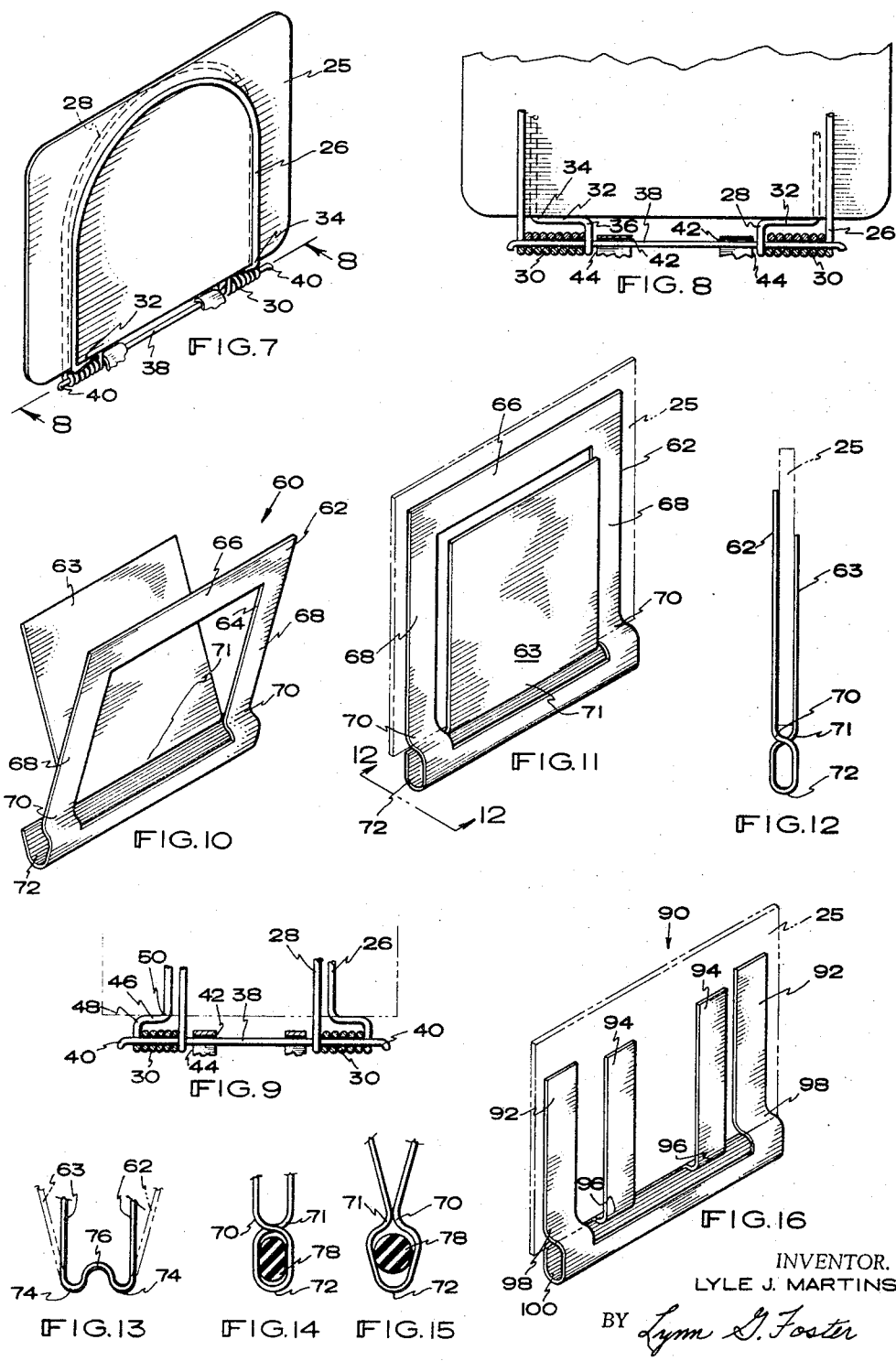
INVENTOR.
LYLE J. MARTINSEN
BY Lynn G. Foster
HIS ATTORNEY

United States Patent Office 3,369,585
Patented Feb. 20, 1968

3,369,585
CREDIT CARD POCKETBOOK
Lyle J. Martinsen, 315 East 6310 South,
Murray, Utah 84107
Filed June 15, 1966, Ser. No. 557,677
8 Claims. (Cl. 150—39)

ABSTRACT OF THE DISCLOSURE

A card-carrying pocketbook containing a resiliently biased clip in the form of jaws adapted (a), when crossed, to securely receive and hold cards in a gripping relation and (b), when the card is removed, to cross over each other to force the pocketbook into an open position thus reminding the owner that the card is absent from the pocketbook.

---

The present invention relates to a credit or like card containing pocketbook and more particularly to a unique credit card folding pocketbook which invariably reminds the owner when any credit card is absent from the folder. Thus, the risk of losing or inadvertently forgetting a credit card or the like, which might otherwise be found and perhaps misused by a stranger, is substantially alleviated.

In recent years, with the enormous increase in the use and ready acceptance of credit cards, the problem of mislaying and losing credit cards has become significant. Nevertheless, while it would be a worthwhile contribution to the art, no previously proposed credit card pocketbook features a system which warns the owner when a credit card has not been appropriately returned to its place in the pocketbook following removal, whether intentional or inadvertent.

The present invention substantially alleviates the mentioned danger of losing and/or misplacing credit cards. In the presently preferred pocketbook embodiments of this invention, a plurality of clamps or clips are used to removably hold credit cards within a suitable folder, as pages in a book. The clamps or clips each resiliently function as jaws which, when crossed, are adapted to accept and forcibly, though removably, retain a single credit card therebetween. When any card is intentionally or inadvertently removed, the associated jaws uncross and force the folder into an "open" position thereby alerting and continuously reminding the owner or user that the card remains absent from the pocketbook. Thus, one is not likely to so remove a credit card from the pocketbook, for example, at a service station or a store, and, subsequently, without intent, leave the credit card at the station or store. Hence, the risk of an unauthorized stranger acquiring and misusing such a credit card to fraudulently purchase goods and/or services is significantly reduced, if not eliminated.

Accordingly, it is a primary object of this invention to provide a novel credit card pocketbook which will warn the user, without fail, when any credit card is absent from the pocketbook.

Another important object of the present invention is to provide a novel credit pocketbook having one or more of the following features: (1) is economical to produce and market, (2) is compact and can be comfortably carried by businessmen and others, (3) accommodates ready access to, removal of, and replacement of any credit card carried within the folder, (4) biases the folder so it cannot be freely closed when a credit card has been removed, (5) accommodates placement within the folder of one or more credit cards with each card serving as a page in a book so as to be readily located and easily removed for use, and (6) forcibly restrains any and all credit cards appropriately within the folder to avoid inadvertent loss of a card from the folder.

These and other objects and features of the present invention will become more fully apparent from the following description and appended claims taken in conjunction with the accompanying drawings wherein:

FIGURE 1 is a perspective representation of the presently preferred pocketbook embodiment of this invention, illustrating the folder in its closed position;

FIGURE 2 is a perspective representation of the pocketbook FIGURE 1 after it has been opened and the user is about to remove a credit card from between associated crossed jaws of a clamp assembly;

FIGURE 3 is a perspective representation of the pocketbook of FIGURE 1 with the folder biased by the uncrossed jaws of the clamp assembly into an open position following removal of the credit card from between the clamp assembly;

FIGURE 4 is a fragmentary representation illustrating the preferred mode of movably joining each clamp assembly to the folder;

FIGURE 5 is a perspective representation of single clamp assembly, of the type shown in FIGURES 2–4, depicted in the uncrossed, open position;

FIGURE 6 is a perspective representation of the clamp assembly of FIGURE 5 with the jaws recrossed as a credit card is being placed therebetween;

FIGURE 7 is a perspective representation of the clamp assembly of FIGURES 5 and 6 after the credit card has been fully and properly positioned between the recrossed jaws;

FIGURE 8 is a side elevation taken along line 8—8 of FIGURE 7;

FIGURE 9 is a perspective representation of a second presently preferred clamp assembly embodiment of this invention illustrated in the crossed, card-retaining position;

FIGURE 10 is a perspective representation of a third presently preferred clamp assembly embodiment of this invention illustrated in the open position;

FIGURE 11 is a perspective representation of the clamp assembly of FIGURE 10 illustrated in the closed, card-retaining position;

FIGURE 12 is an end elevation taken along line 12—12 of FIGURE 11;

FIGURE 13 is an end elevation of another, reverse bend union which resiliently joins the jaws of any clamp assembly;

FIGURES 14 and 15 are end elevations of an elastomeric embodiment used to further resiliently bias the jaws (a) against the adjacent credit card (FIGURE 14), when the card is properly positioned and (b) into an open, folder-biasing position (FIGURE 15), when the credit card has been removed; and FIGURE 16 is a perspective representation of a fourth presently preferred clamp assembly embodiment of this invention.

Specific reference is now made to the drawings wherein like numerals are used to designate like parts throughout. FIGURE 1 depicts in perspective a presently preferred credit card pocketbook, generally designated 20. The credit card pocketbook 20 is compact, preferably about wallet size, for easy carrying in a pocket, purse or the like when in the closed position, as illustrated in FIGURE 1.

The credit card pocketbook 20 comprises a folder 22 and a plurality of clamp or clip assemblies 24 for individually holding one or more credit cards 25 within the folder in stacked relation, much the same as pages in a book. The folder 22 can be of any suitable material such as plastic or leather, suitably fabricated and fastened together by sewing, bonding or the like.

The clamp assemblies 24 are suitably associated with the folder 22 to accommodate rotational and linear movement of each clamp relative to the other for convenient stacking of cards and easy and fast access to the credit card of the user's choice (FIGURE 2). Any card can be easily removed for use, at which time the associated clamp assembly will become biased in an open position to forcibly hold the folder open so that it cannot be freely closed, as will be explained in greater detail subsequently. The open biasing of the folder will inherently remind the user of the credit card pocketbook of the absence of any given card from the time it is removed until it is replaced.

Each clamp assembly 24, as seen in FIGURES 5-8, comprises a pair of wire loops 26 and 28, preferably formed of spring steel and fabricated from a single length of wire being appropriately joined by a suitable weld 29 or the like. The loop 28 is dimensionally slightly smaller than the loop 26 to accommodate crossing and uncrossing of the loops in a matter and for purposes later to be more fully explained.

The loops 26 and 28 respectively resiliently terminate as an integral pair of coils 30 so that, in the unbiased position as shown in FIGURE 5, the respective planes containing the two loops 26 and 28 will be disposed at a substantial angle with respect to each other for the purpose of accommodating biasing of the folder into the open position, as previously mentioned.

The loop 28 further comprises a pair of card-stop abutment portions 32 transversely interposed between two essentially right-angular bends 34 and 36. The stop abutment portions 32 are respectively disposed at slight angles to the plane containing the loop 28, as best illustrated in FIGURE 7. Thus, the stop abutment portions 32 will limit the distance that a given credit card 25 may be inserted between the loops 26 and 28 when the loops disposed in crossed relation. A rod or wire 38 centrally passes through the two previously mentioned coils 30 and has deformed ends 40 to prohibit inadvertent displacement of the central wire 38 from the coils and to stabilize the out-to-out distance between the coils 30.

While any suitable attachment may be used to join the clamp assemblies 24 to the folder 22, the preferred attachment is illustrated in FIGURE 4. As depicted, each central rod 38 of each clamp assembly 24 passes through a close fitting aperture 42 in the folder 22, in the vicinity of the fold. Each central wire 38 also passes through a transverse open slot 44 as shown in FIGURE 4. Thus, each clamp assembly 24, which is designed to forcibly, though releasably, retain a credit card 25, is so associated with the folder as to be retained therein yet be freely rotatable for easy selection of a desired credit card. Likewise, each clamp assembly is longitudinally displaceable to accommodate compact stacking of a series of clamp-retained cards within the folder 22. Utilization of a small diameter central wire 38 is often desired so that the outside diameter of coils 30 will be sufficiently minimized to readily accommodate the card stacking feature mentioned above.

Operationally, as seen in FIGURE 2, each credit card is firmly held, when properly installed between crossed loops 26 and 28 by essentially opposed forces exerted by the crossed wire loops, the forces being generally normal to the surfaces of the card. By reason of the mentioned normal forces, it is extremely difficult, if not essentially impossible, for a credit card 25 to inadvertently fall from the folder 22 without being noticed by the owner.

When a given credit card 25 is removed from its position within the folder 22, in the manner shown in FIGURE 2, the loops 26 and 28 uncross into the position generally illustrated in FIGURE 5, thereby biasing the folder into the open position of FIGURE 3. Thereafter, the folder 22 can not be freely closed and, thus, provides the reminder mentioned previously.

When it is desired to place or replace a credit card, for example following use, the loops 26 and 28 are relatively displaced manually into crossed relation and the card is displaced therebetween as shown clearly in FIGURE 6. When the card 25 has been fully displaced between the loops 26 and 28, which act as jaws, the credit card will abut the stop portions 32 and will be forcibly retained by the clamp assembly 24 as clearly depicted in FIGURES 7 and 8.

Specific reference is now made to FIGURE 9, which depicts a second presently preferred embodiment of this invention, which is very similar to the previously described embodiment, corresponding parts being designated with corresponding numerals. The only basic difference comprises the provisions of stop abutment portions 46 near the proximal ends of the outside loop 26, transversely between essentially right angle bends 48 and 50, instead of being situated upon the inner loop, as illustrated at 32 in the first embodiment. The most significant advantage of the embodiment FIGURE 9 resides in the ease with which clamp assembly can be manufactured. The winding of the coil 30 and the deforming of the loop 26 to form the stop abutment portions 46 can be achieved without interference with the smaller loop 28.

A third presently preferred clamp assembly embodiment of present invention generally designated 60, is depicted in FIGURES 10-12 to which reference is now made. As can be appreciated by reference to the mentioned figures, the clamp assembly 60 can easily be stamped in a single operation from sheet metal, though other materials, such as plastic, could be used.

Structurally, the clamp assembly 60 comprises a rectangular frame, including members 66 and 68 which together form an opening 64, and a plate 63 flexibly joined to the frame 62 at a predetermined angle, when in the open position of FIGURE 10. The frame 62 at the proximal ends of parallel number 68 comprise bend portions 70, which are integrally connected to a U-shaped flexible union 72. Similarly, the plate 63 comprises a bend portion 71 near the proximal end thereof where it joins the U-shaped union at 72. The bend portions 70 and 71 accommodate disposition of a credit card 25 between the frame 62 and the plate 63, which act as jaws when disposed in the crossed relation, as shown in FIGURE 12. The flexible U-shaped union 72 can be suitably movably joined to the folder 22 or the like by any appropriate means, such as rivets or rods.

To achieve a greater measure of flexibility, the embodiment of FIGURES 10-12 (or that of FIGURE 16) can utilize a flexible union between the respective jaw members (a) as shown in FIGURE 13 or (b) as shown in FIGURES 14 and 15. The flexible union of FIGURE 13 comprises a series of sinuous, reverse bend, U-shaped portions 74 and 76. Also, if desired, the union 72 of FIGURES 10-12 can be equipped with a "live" rubber segment 78 to assist in biasing the folder into the open position, when a credit card has been removed as previously explained.

A fourth presently preferred clamp assembly embodiment of the present invention, generally designated 90, is depicted in FIGURE 16 to which specific reference is now made. The clamp assembly 90 is structurally and functionally similar to the clamp assembly embodiments previously described and comprises cantilever fingers 94 and 92 resiliently and integrally joined by a U-shaped union 100. A bend 98 is disposed intermediate the U-shaped union 100 and each cantilever finger 92 while a bend 96 is interposed between the union 100 and each centilever finger 94. Thus, the fingers 92 and 94 are crossed, a credit card 25 (shown in phantom lines in FIGURE 16) can be interposed and forcibly, though releasably, retained between the crossed fingers 92 and 94. When the credit card is removed the fingers of 94 and 92 will uncross and assume an angular relationship one with respect to the other to force the folder 22 into open position thereby reminding the user of the absence of the card until replaced.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are therefore to be embraced there.

What is claimed and desired to be secured by United States Letters Patent is:

1. In a card-containing pocketbook, a folder, at least one clamp means movably associated with the folder and comprising at least first and second jaw means resiliently associated one with another, the first and second jaw means each having a size and configuration which accommodates crossing over and uncrossing of the jaw means relative to each other to accommodate (a) biasing of a card releasably between the jaw means within the folder with the jaw means disposed in crossed relation and (b) biasing of the folder in an open position when the card has been withdrawn and the jaw means have uncrossed into angularly related positions.

2. A device as defined in claim 1 wherein said first and second jaw means comprise wire loops each of a different size accommodating passage of one loop through the other to place a card within the folder between the crossed jaw means and following removal of a card to bias the folder open.

3. A device as defined in claim 2 wherein one loop has at least one card-engaging stop portion adjacent to the resilient association to limit the distance said card may be inserted between said jaw means.

4. A device as defined in claim 2 wherein said wire loops are resiliently associated through integral coil means and said movable association between the folder and the clamp means comprises a small diameter wire passing through a portion of the folder and fixably joined to said coil means to accommodate a limited amount of both rotational and linear displacement of the clamp means relative to the folder.

5. A device as defined in claim 1 wherein said jaw means comprise essentially cantilevered planar means the planar means being respectively sized and shaped so that when in close superposition one planar means will not overlap the other planar means when viewed generally perpendicular to the planes containing the planar means to accommodate displacement of one planar means across the other without interference therebetween when either placing a card between the planar means or after removing a card from between the planar means.

6. A device as defined in claim 1 wherein said resilient association between the first and second jaw means comprises U-shaped reverse bend means.

7. A device as defined in claim 1 wherein said resilient association between the first and second jaw means comprises elastromeric means disposed between the jaw means.

8. A folder for carrying one or more credit cards and the like comprising clip means movably associated with the folder in the vicinity of a fold and adapted to releasably hold at least one card within the folder, said clip means comprising at least two biasing means united near said fold and cantilevered from said union, generally within separate planes, and means continuously urging the two biasing means into open generally spaced relation with said planes disposed in angular relation one with respect to the other and the folder biased open when a card is not appropriately interposed between the biasing means, said union and said biasing means being so sized and constructed to accommodate displacement of said biasing means across each other counter to the influence of the urging means and placement and retention of said card therebetween in the folder, the folder thereby becoming freely closable, with said biasing means each extending essentially in planes generally parallel to the plane of the card and exerting opposed generally normal forces upon opposite faces of the card.

References Cited

UNITED STATES PATENTS 3,120,041   2/1964   Voss _____ 24—81

JOSEPH R. LECLAIR, *Primary Examiner.*

FRANKLIN T. GARRETT, *Examiner.*